United States Patent [19]
Roberts et al.

[11] Patent Number: 5,269,116
[45] Date of Patent: Dec. 14, 1993

[54] DEVICE FOR FEEDING A STRING LOOP FOR ATTACHMENT TO A SAUSAGE CASING

[75] Inventors: Brian W. Roberts, Apex; Johnny T. Stanley, Raleigh; Thomas E. Whittlesey, Apex, all of N.C.

[73] Assignee: Delaware Capital Formation, Inc., Apex, N.C.

[21] Appl. No.: 41,886

[22] Filed: Apr. 2, 1993

Related U.S. Application Data

[63] Continuation of Ser. No. 776,796, Oct. 15, 1991, abandoned.

[51] Int. Cl.⁵ .............................................. B65B 61/14
[52] U.S. Cl. .................................. 53/138.4; 53/134.1; 53/139.4; 53/389.4; 493/926; 452/48; 452/51
[58] Field of Search ............... 206/345; 226/82, 83, 226/152, 158, 159; 156/238, 541; 29/243.56, 518, 519, 773, 774; 452/48, 51; 493/226, 383, 926; 53/389.2, 389.4, 413, 134.1, 134.2, 138.2, 138.3, 138.4, 139.4

[56] References Cited

U.S. PATENT DOCUMENTS

| | | | |
|---|---|---|---|
| 2,894,363 | 7/1959 | Vogd | 53/389.2 X |
| 3,951,262 | 4/1976 | Niedecker | 206/343 |
| 3,953,278 | 4/1976 | Smith et al. | 156/541 X |
| 4,044,450 | 8/1977 | Raudys et al. | 53/138.4 X |
| 4,165,593 | 8/1979 | Niedecker | 53/138.4 X |
| 4,255,218 | 3/1981 | Stageberg | 156/238 |
| 4,308,022 | 12/1981 | Inoue | 483/926 X |
| 4,345,411 | 8/1982 | Niedecker | 493/926 X |
| 4,347,094 | 8/1982 | Watanabe | 156/238 X |
| 4,502,910 | 3/1985 | Voltmer et al. | 156/238 X |
| 4,612,684 | 9/1986 | Kollross | 452/51 X |
| 4,694,537 | 9/1987 | Kollross | 452/48 |
| 4,720,010 | 1/1988 | Bertram | 206/340 X |
| 5,067,313 | 11/1991 | Evans | 53/138.4 X |

*Primary Examiner*—John Sipos
*Assistant Examiner*—Daniel Moon
*Attorney, Agent, or Firm*—Allegretti & Witcoff, Ltd.

[57] ABSTRACT

Improved apparatus for attachment of a U-shaped metal clip around gathered material in a first tie operation along with means for attachment of a string loop includes a tape feed which feeds loops mounted on the tape one at a time into position for engagement with a loop feed mechanism that directs the loop into the throat of a clipper. There the clip is attached about gathered casing or netting material by means of a clipper. Once the clip is attached, the entire first tie assembly is removed by take out wheels.

3 Claims, 8 Drawing Sheets

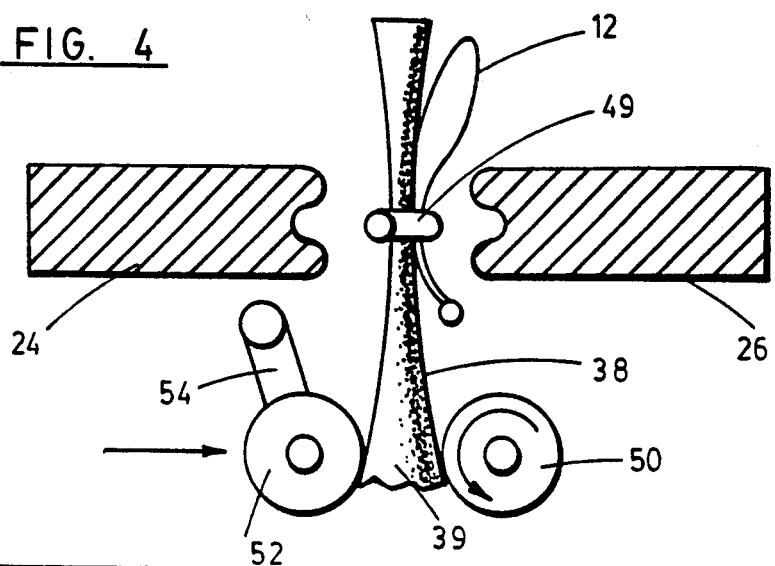
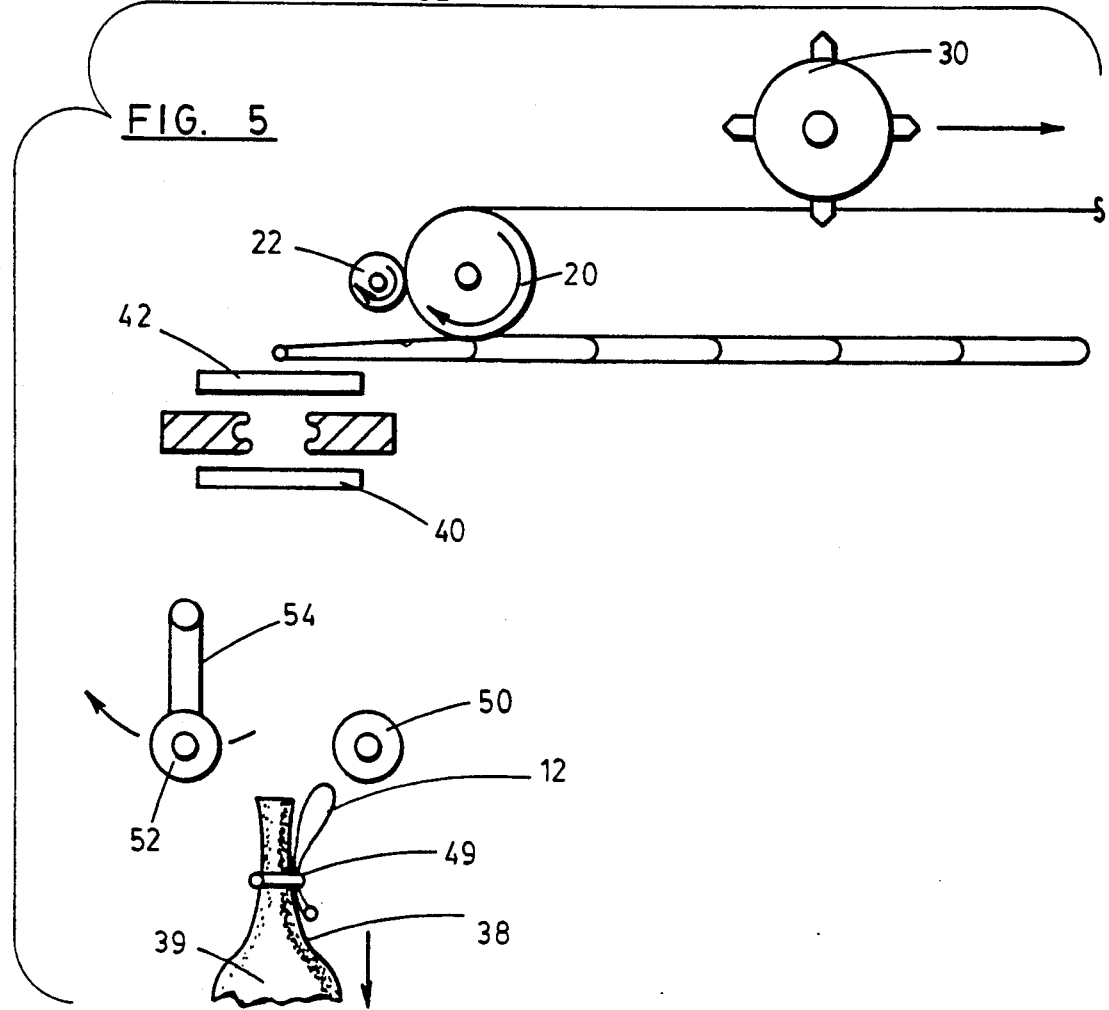

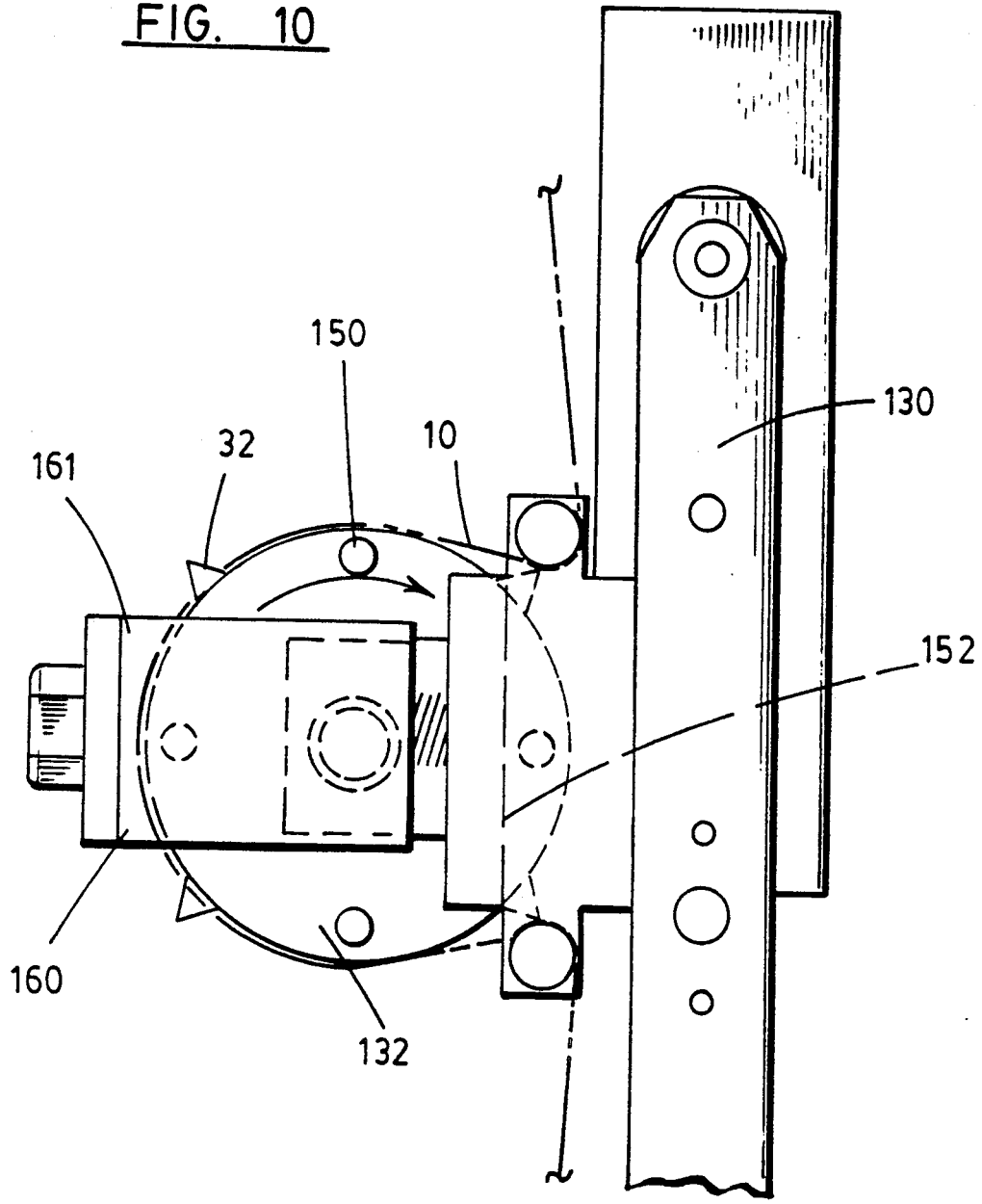

DEVICE FOR FEEDING A STRING LOOP FOR ATTACHMENT TO A SAUSAGE CASING

This application is a continuation divisional, of application Ser. No. 07/776,796, filed Oct. 15, 1991, abandoned.

BACKGROUND OF THE INVENTION

This invention relates to an improved apparatus for attachment of a U-shaped metal clip around gathered material to provide a "first tie" for the material.

Heretofore it has been desirable, in the product packaging arts, to provide a sleeve or casing or a similar material with a "first tie" or closure at one end thereof. The casing material having the first tie at one end and an opening at its opposite end is then shipped to a site at which a product is placed within the casing material through the open end. A second tie or closure may then be effected to the open end of the casing.

It has been determined that it is desirable to attach a string loop to the casing material during the first tie operation at the "first tie" end of the package. Ultimately the packaged product may be carried by the string loop for curing, cooking or other processing. Attachment of a string loop during a first tie operation is a complex and often difficult procedure. Heretofore, clippers of the type such as shown in U.S. Pat. No. 2,889,419 could be used to gather one end of packaging material with a string loop being manually inserted in the throat of the clipper with casing material for attachment at the first tie and upon clipper operation. U.S. Pat. No. 4,004,339 discloses an other clipper of the type which could be used for such an operation.

Bertram in U.S. Pat. No. 4,720,010 proposed feeding string loops from a continuous tape during a first tie operation. However, heretofore there has not been any satisfactory way for the automatic placement of a first tie string loop in a clipper with casing material prior to attachment of a clip. The present invention addresses this problem.

SUMMARY OF THE INVENTION

Briefly, the present invention comprises, in combination, a mechanism for feeding a tape having a series of string loops fastened thereto in overlapping relation and for discharging the string loops, one loop at a time, adjacent to the throat opening of a clipper. The clipper is of the type for attaching U-shaped metal clips about gathered material. Once the string loop and, in particular, the knotted end of the string loop is positioned adjacent the throat or opening of the clipper, a second loop feed mechanism positively engages the end of the string loop and forces it into the clipper throat. The loop feed mechanism is thereafter withdrawn and a clip is fastened about gathered material including the string loop to complete a first tie operation. Take out rolls are provided to subsequently remove the first tie packaging material from the clipper following attachment of the clip and string loop. Also, the tape feed mechanism advances the tape an incremental distance for feeding of the next string loop into position thereby making the assembly ready for a repeat of its first tie clipping operation.

Thus, it is an object of the invention to provide an improved first tie clipper apparatus of the type which simultaneously and automatically provides for attachment of a string loop.

Yet a further object of the invention is to provide an improved first tie clipper apparatus which includes a mechanism for positively feeding the tie end of a string loop that is detached from a series of loops attached to a tape.

Yet another object of the invention is to provide an improved first tie clipper apparatus wherein a tape feed of string loops is provided with a mechanism for incrementally feeding the string loops one at a time into the clipper apparatus.

Yet another object of the invention is to provide a first tie clipper apparatus which is easy to operate, has a very high reliability and a minimum number of mechanical parts.

These and other objects, advantages and features of the invention will be set forth in the detailed description which follows.

BRIEF DESCRIPTION OF THE DRAWING

In the detailed description which follows reference will be made to the drawing comprised of the following figures:

FIGS. 1 through 5 comprise a schematic representation of the sequential steps and the separate component parts comprising the improved method and apparatus of the invention.

FIGS. 6 through 10 comprise detailed drawings of the apparatus of the invention.

Figure 1A:
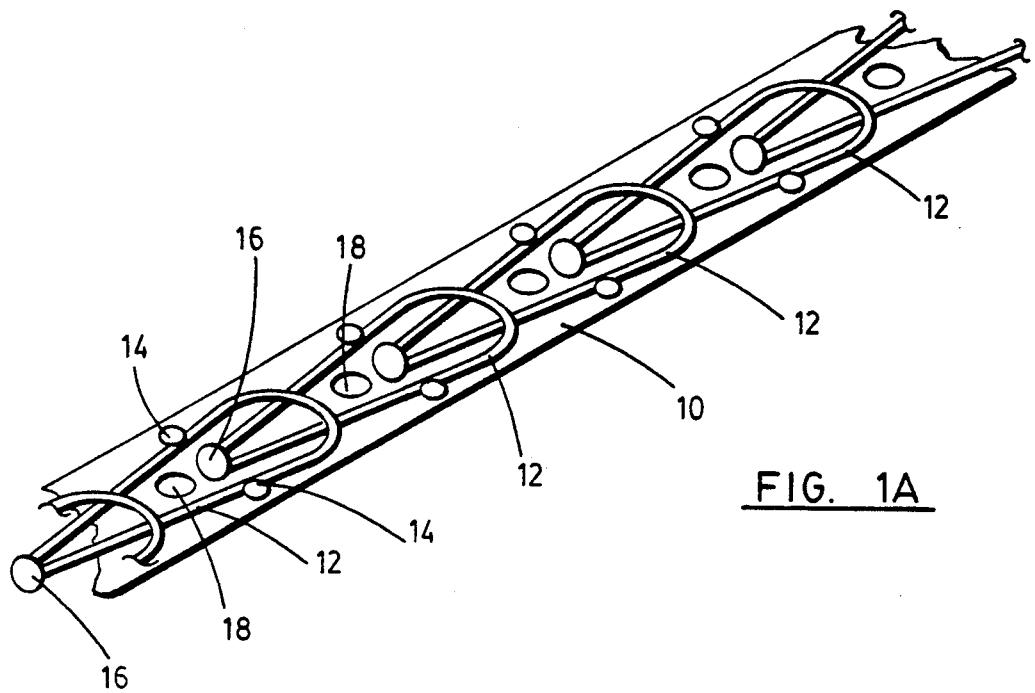
FIG. 1A is a perspective view of a length of flexible tape having string loops arranged thereon.
Figure 1:
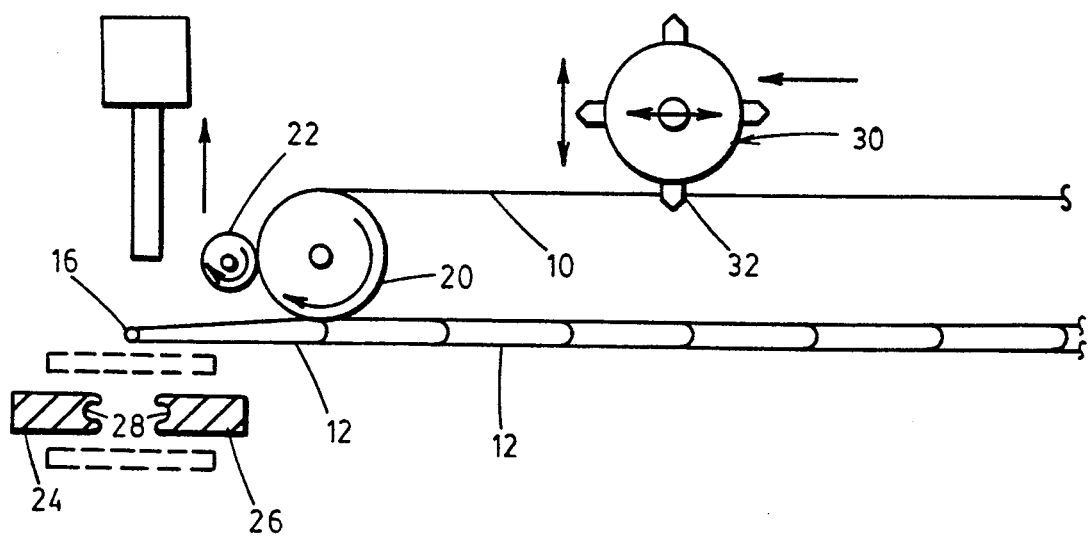
Figure 2:
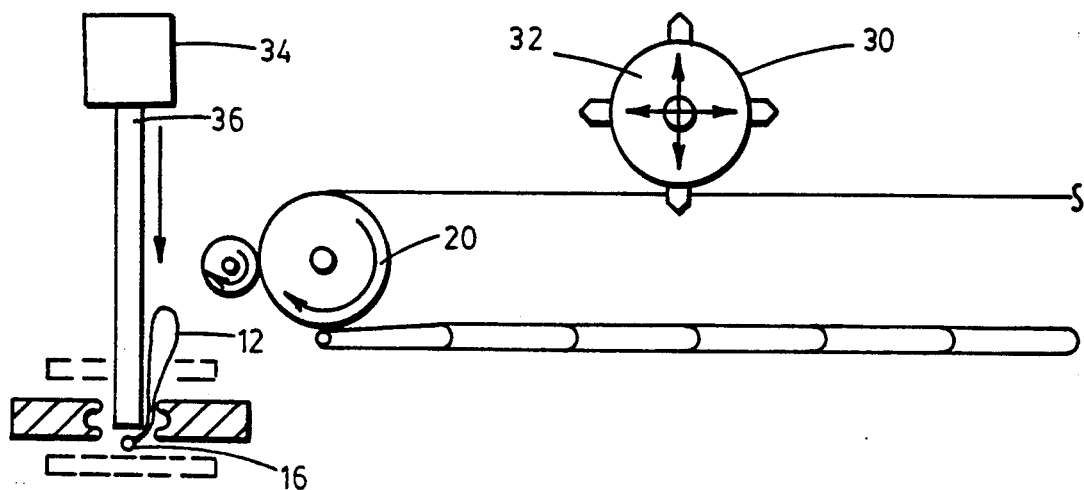
Figure 3:
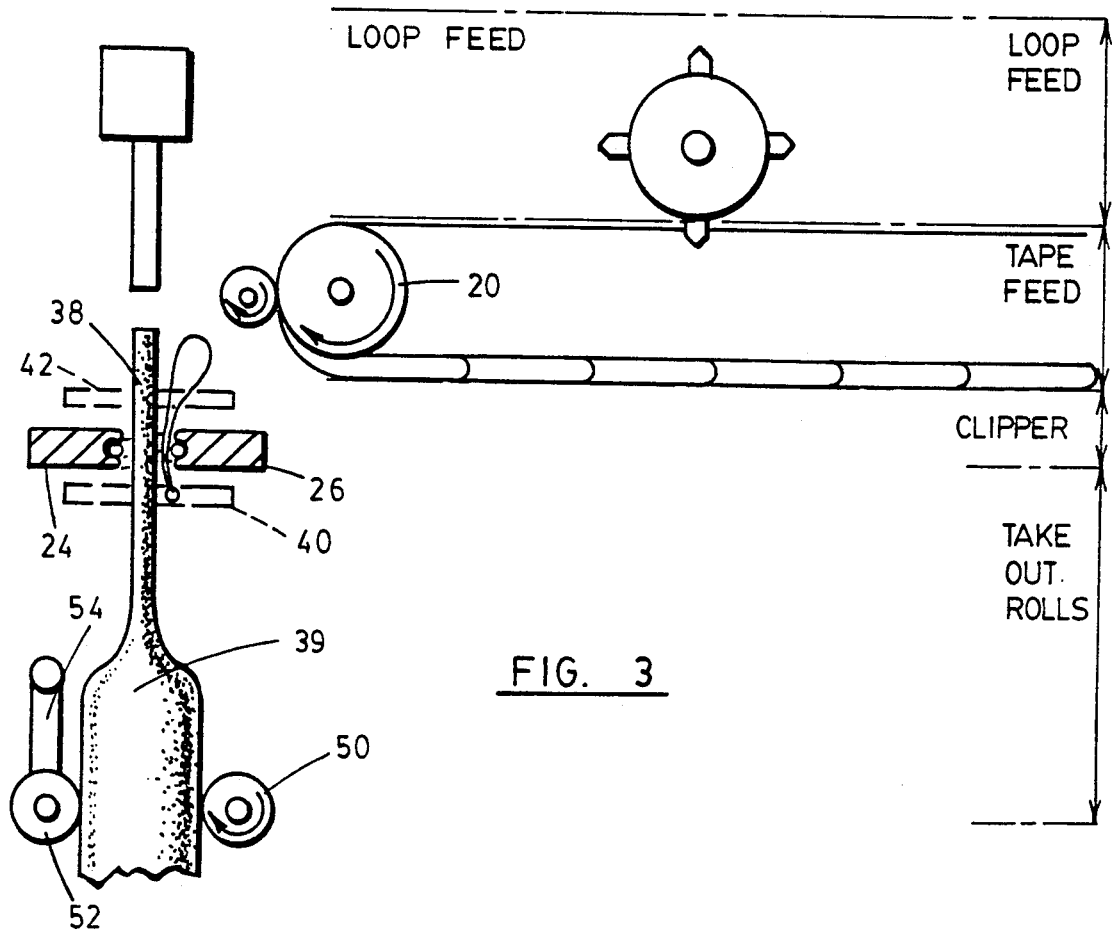
Figure 6:
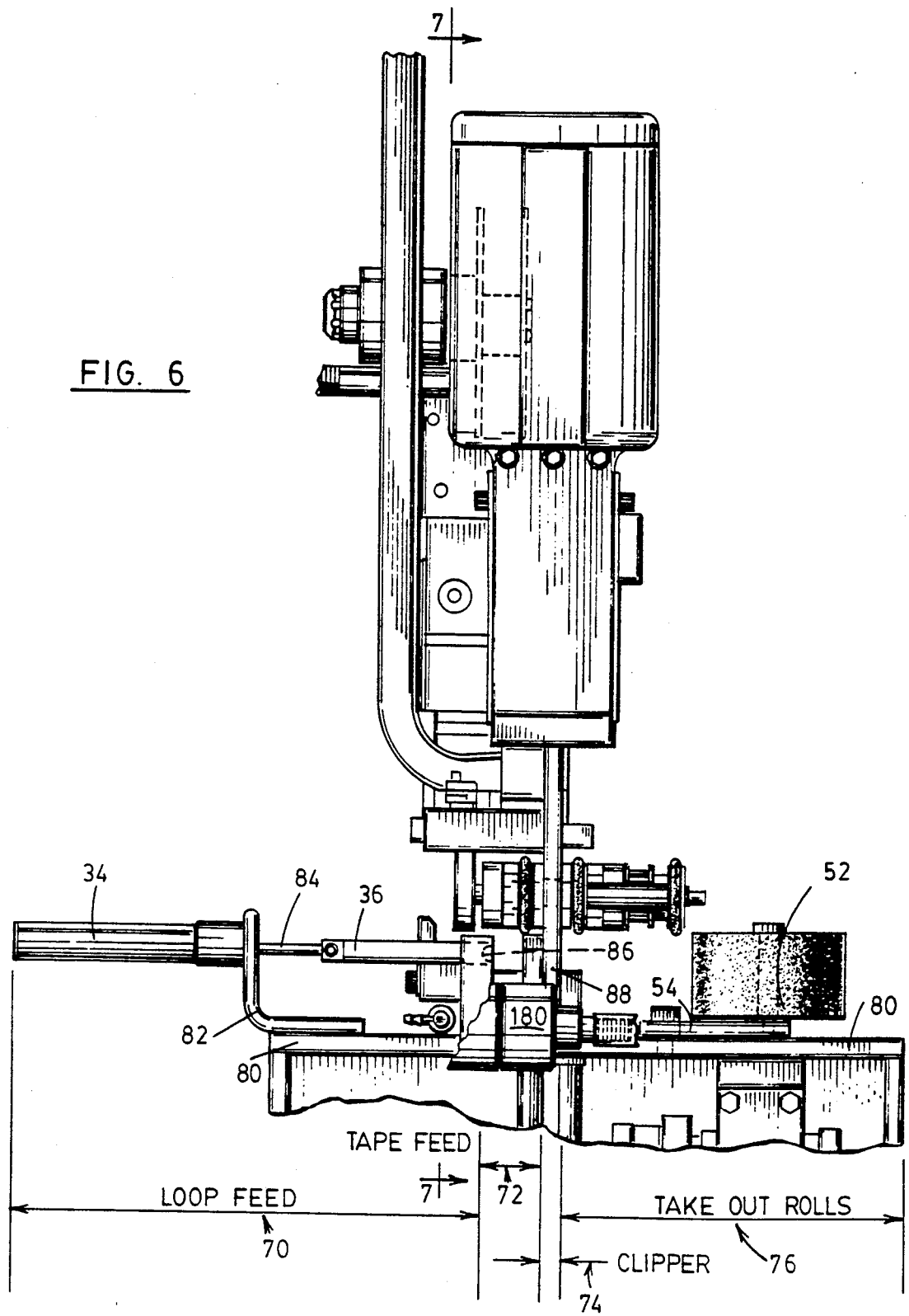
Figure 7:
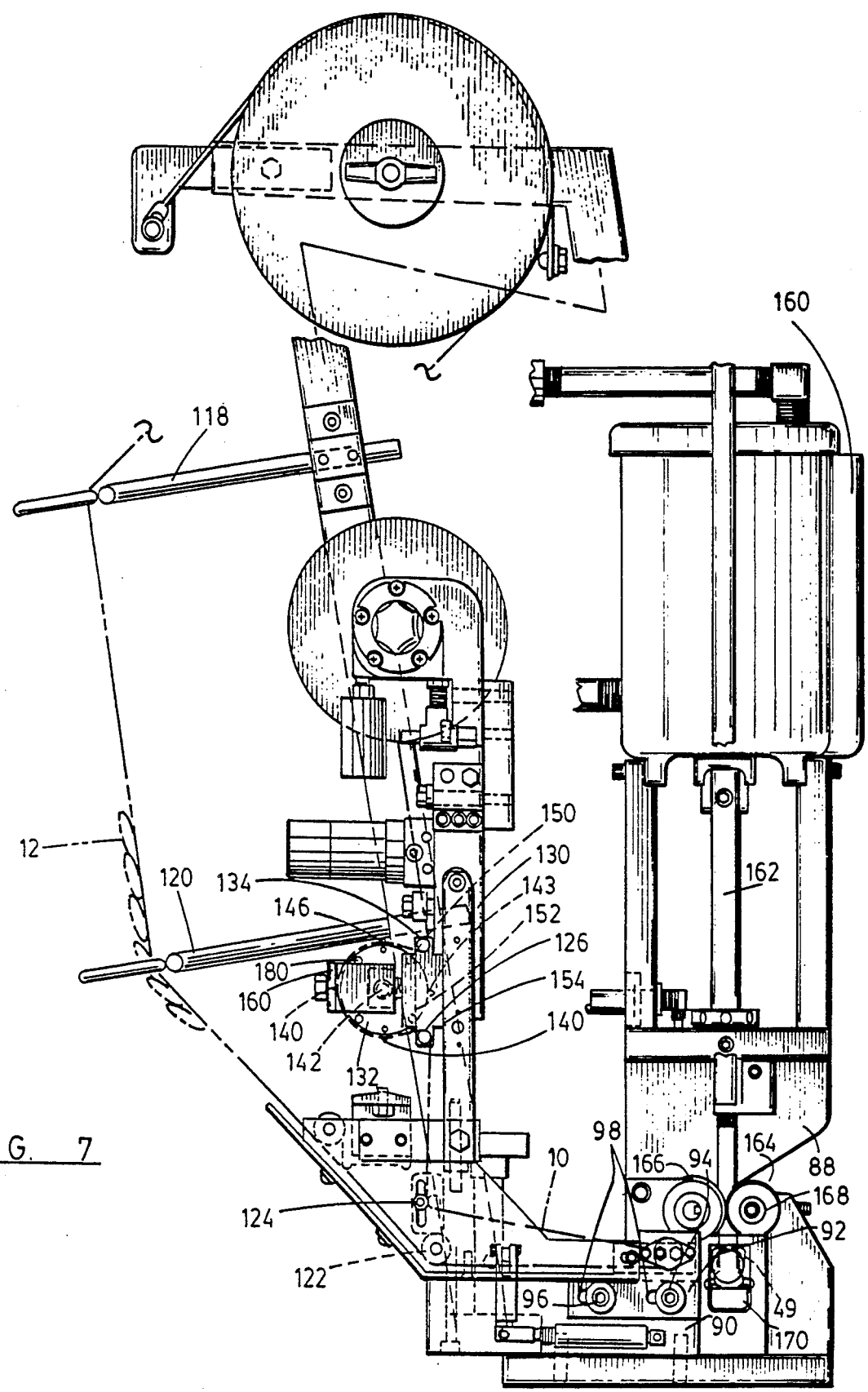
Figure 7A:
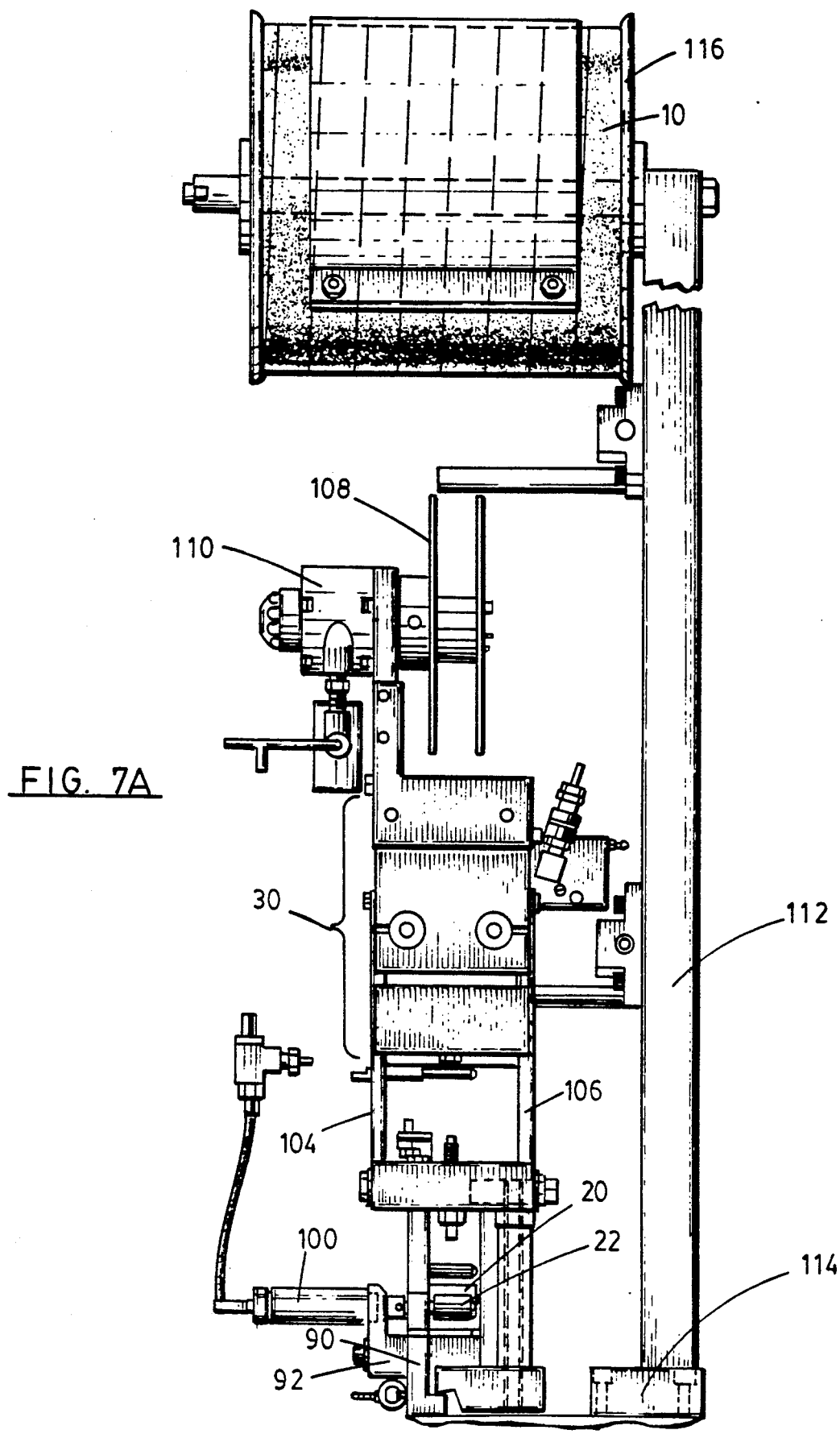

Thus, FIG. 1 schematically depicts a tape feed mechanism for feeding a single string loop from a tape into the region adjacent the throat of a clipper;

FIG. 2 schematically illustrates the next sequential step in the operation of the apparatus wherein the single string loop is feed by a loop feed mechanism into the throat opening for a clipper;

FIG. 3 schematically depicts yet the further continuing operation of the mechanism wherein the clipper is actuated to attach a clip about gathered packaging material and the end of the string loop;

FIG. 4 is a schematic view of the take out wheels which remove the first tie casing material from the clipper;

FIG. 5 is a schematic view of the subsequent operation of the tape feed mechanism which advances the next sequential string loop by incremental movement of the tape which carries the string loop;

FIG. 6 is an elevation of the preferred embodiment of the invention which incorporates a string loop feed, tape feed, clipper and take out rolls;

FIG. 7 is a side elevation taken substantially along the line 7—7 in FIG. 6 depicting in greater detail the tape feed mechanism and clipper;

FIG. 7A is an elevation view of the structure of FIG. 7, taken from the right of FIG. 7, with the punch and die structure of the apparatus, including elements such as 160 and 162, deleted to show the elements of the tape feed in greater detail.

Figure 8:
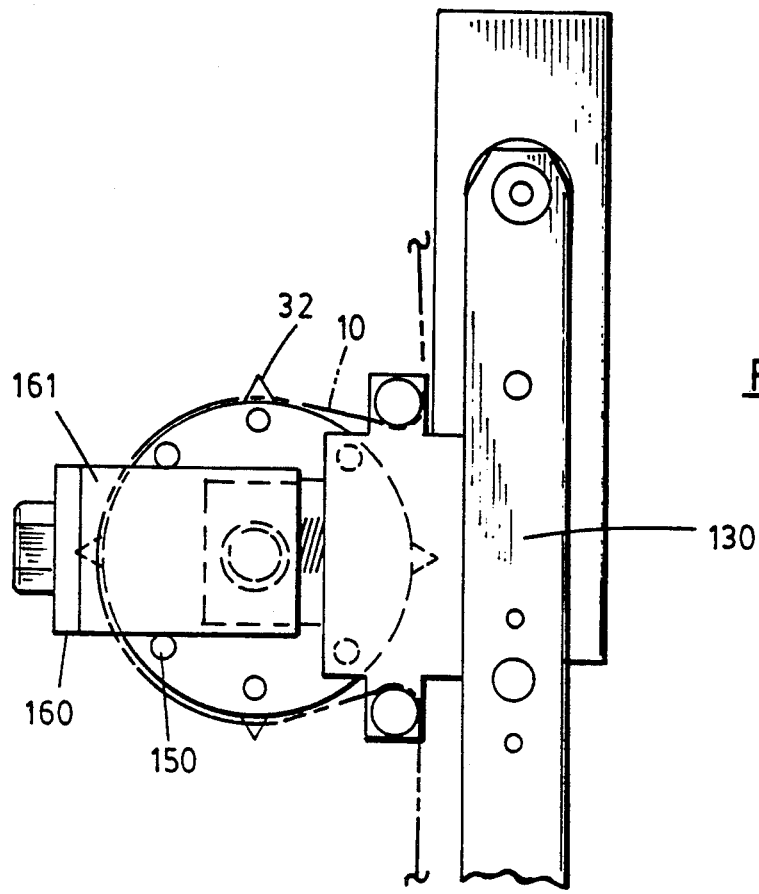
Figure 9:
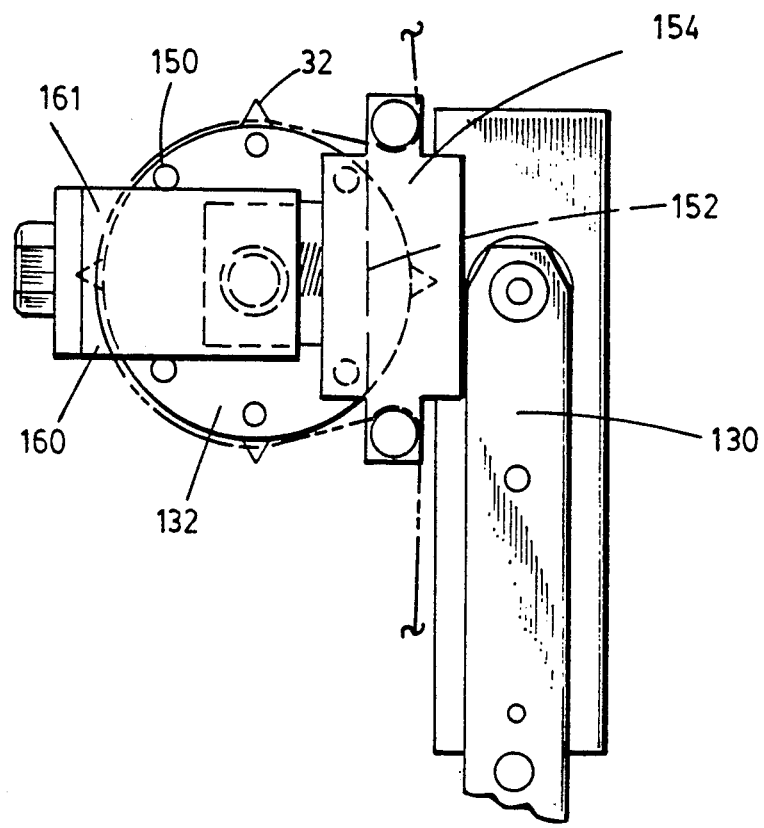

FIG. 8 is an enlarged side detail view of the incremental advance mechanism comprising a sprocket wheel and carriage for advancing the tape feed;

FIG. 9 is a detail view similar to FIG. 8 depicting the advancement of the tape by one increment; and FIG. 10 is a further sequential view of the carriage and sprocket mechanism of FIGS. 8 and 9 wherein the sprocket and carriage are returning to a position in preparation for further advancement of the tape.

DESCRIPTION OF THE PREFERRED EMBODIMENT

FIGS. 1 through 5 illustrate, in a series of schematic diagrams, the component parts of the improved apparatus of the present invention, as well as the method of the invention. Preliminarily, it is noted that the invention may be utilized in combination with a tape to which there is attached a series of string loops which are arranged in an overlapping manner, such as taught in Bertram U.S. Pat. No. 4,720,010. The tape may be modified with respect to the teachings in Bertram and thus is somewhat distinctive therefrom. The tape 10 is thus a longitudinal strip of flexible material to which there is attached, in an overlapping manner, a series of knotted string loops 12. These string loops 12 are attached to the tape 10 by means of a glue or adhesive with one end of the loop being generally free from attachment to the tape 10 in that it is not glued. In a preferred embodiment, the end which is not attached to the loop is the knotted end 16 of the string loop 12.

Thus, as shown in FIG. 1-A, tape or strip 10 of flexible material such as mylar or cellophane or the like, is provided with a series of string loops 12 attached thereto by means of an adhesive 14 which is provided at side portions of each loop 12. For example, adhesive 14 attaches the sides of the loop 12 to the tape 10. Each of the loops 12 are overlapped with respect to each other. Thus, a knotted end 16 of the first loop 12 projects longitudinally from the tape 10. The opposite looped end of the loop 12 overlies the next adjacent knotted end 16 of the next adjacent loop 12. This arrangement continues onward along the length of the tape 10. At uniformly spaced increments, substantially equal to the spacing between the loops 12 are indexed openings 18 in the tape 10. These openings 18 are used in conjunction with the apparatus of the present invention for purposes for advancement of the tape 10 by a uniform incremental distance during operation of the apparatus and performance of the method of the invention. An object of the invention then is to feed a loop 12 individually into a clipper for attachment together packaging material in a first tie operation. Preferably the knotted end 16 is fed into the clipper so that the free loop end is maintained free for manual gripping, hanging or the like.

FIG. 1 of the drawings illustrates the step of feeding the loop 12. FIG. 1 represents an appropriate initial starting point in the description of the sequence of events in the method of the invention, even though in actual practice the initial step or event is placement of casing material into the clipper as described below. Thus, as shown in FIG. 1, the tape 10 fits over an idler roller 20 with the string loops 12 on the outside of the idler roller 20 and the tape 10 intermediate of the loops 12 and the roller 20. In this manner the knotted end 16 of each string loop 12 is directed away from the tape 10 as tape 10 passes over the roller 20, and the roller 20 moves in the direction of the arrow indicated in FIG. 1. A constantly running stripper roller 22 insures that the loop 12 will be stripped from the tape 10 as tape 10 moves over roller 20. Thus, the roller 22, which frictionally engages against the tape 10, rotates in the same direction as the idler roller 20.

The loop 12 is fed from the tape 10 to a position which is immediately adjacent and parallel to an opening defined by a pair of clip rails 24 and 26 which a define a clip channel 28 of a clipper. The tape 10 is advanced over roller 20 to position the knotted end 16 of loop 12 by means of an incremental advance mechanism represented schematically as the advance mechanism 30 in FIG. 1. The advance mechanism 30 includes a pin 32 on a wheel which fits through one of the previously described openings 18 in the tape 10. The advance mechanism 30 moves the wheel, projecting pin 32 and tape 10 to the right in FIG. 1 to thereby transport the tape 10 over the idler roller 20 in a direction which causes the loop 12 to advance toward the channel 28. After advancing one incremental step, defined by the distance between two adjacent openings 18, the advance mechanism 30 terminates movement of the tape 10, pin 32 disengages from the tape 10 and a subsequent pin 32 ultimately engages tape 10 in preparation for further incremental advancement of the tape 10. Subsequent advancement is delayed, however, until the remaining steps of the first tie operation are completed.

The next step in the operation of the apparatus is schematically illustrated in FIG. 2. A loop feed mechanism is provided which positions the knotted end 16 of the loop 12 within and between the channels 28. The loop feed mechanism comprises a cylinder 34 which actuates a loop feed punch or rod 36 by driving that rod 36 into engagement with the knotted end 16 of the loop 12 to push the knotted end 16 between the channels 28. The loop rod or punch 36 then retracts as illustrated in FIG. 3.

The next step of operation, illustrated by FIG. 3, is initiated by manually positioning the free end of a casing material such as free end 38 into the throat of a clipper and thus between the channels 28. As the free end 38 is inserted in the throat of the clipper and thus between the channels 28, it is engaged by pleat forming blocks 40 and 42 positioned on opposite sides of the clipper rails 24 and 26. This causes pleats to form in the end 38 so that the casing will fold and gather in a desired pattern. The loop 12 and the formed end 38 are thus positioned between rails 24 and 26 and channels 28.

Subsequently, a punch will drive a U-shaped metal clip down the channels 28 around the end of the loop 12 and the end 38 to thereby seal off or close the end 38 of the casing material and simultaneously attach the loop 12.

Again referring to FIG. 3, the next or subsequent operation performed by the apparatus of the invention is effected by take out rolls 50 and 52. The take rolls 50 and 52 are positioned in an opposed relation to one another and on opposite sides of a pathway of the casing material 39. Take out roll 50 is constantly driven as indicated by the arrow in FIG. 3. Take out roll 52 is an idler roll which is normally spaced from the active roll 50. Idler roll 52 is mounted on a pivot arm assembly 54 which, as shown in FIG. 4, is pivoted to thereby move idler roller 52 toward engagement with active roller 50 after the casing end 38 and loop 12 have been clipped together. Simultaneously, the pleat forming blocks 40, 42 retract. The casing material 39 thus is gripped between the rolls 50 and 52 and immediately pulled from the clipper section or clipper between the channels 24 and 26.

Thus, a clip 49 and loop 12 having been fastened to the gathered netting material 39 is removed from the clipper, as depicted in FIG. 5.

As further depicted in FIG. 5, the tape feed, comprised of the incremental advance mechanism 30, idler roller 20, and friction roller 22, automatically commerce operation upon ejection of clipped netting material 39 from the clipper. In the manner previously described then, the next sequential loop 12 is positioned adjacent the opening between the channel members 24 and 26 for engagement by the loop feed rod 36. Also, as further depicted in FIG. 5, upon discharge of the netting material 39 from the channel members 24, 26 and clipper, the arm 54 swings the idler roller 52 back to its normal, disengage position.

In actual operation, the first step in the sequence of steps performed by the apparatus of the invention is the step of positioning casing material 39 in the clipper throat between channel members 24, 26 followed by movement of the clip punch downwardly in the channel members 24 and 26 to engage a clip 49. This first step, or beginning step, is initiated by manual placement of the netting material 39 into the throat of the clipper. Such manual placement is sensed by photo cell which initiates the sequence of operations of the apparatus beginning with operation of the clipper punch. Thus, by placing netting material 39 within the throat of the clipper, the pleating blocks 40, 42 facilitate folding of end 38 and the first step is downward movement of a clip punch to place the clip 49 about the gathered end 38 of netting material 39 and the loop 12. After the clip 49 is placed about the netting material 38 and loop 12, the clip punch moves upward. Substantially, simultaneously with the upward movement of the punch, the pleater bars 40 and 42 move downwardly so that they no longer engage or touch the end 38 of netting material 39. The idler ejection wheel 52 which is brought toward engagement with the active ejection wheel 50 engages and remove the netting material 39 from the apparatus. The movement of roll 52 is then reversed and the rolls 50 and 52 are separated as the netting material 39 has been removed. The pleater bars 40 and 42 then move upward into position adjacent to the channel members 24 and 26 as illustrated in FIG. 5.

Subsequently, the tape advance mechanism 30 engages the tape 12, and moves tape 10 one incremental step to effect movement of a loop 12 into position. The advance mechanism 30 then immediately resets itself so that it is in position for the next incremental advancement step of the tape 10. The punch or rod 36 associated with the loop feed then engages the loop 12 moving loop 12 into the region between the channel members 24 and 26. The punch member 36 then retracts immediately. The apparatus is then ready to accept an additional or new length of netting material or casing material 39 which will be detected by the photo cell and thus initiate the entire sequence once again.

The apparatus for performing the method is described in greater detail below. With such apparatus, it is possible to significantly increase the manufacturing output of first tie netting and casing, particularly such netting and casing having a loop attached thereto by means of a clip.

The apparatus is substantially arranged in the manner described in the schematic description set forth with respect to FIGS. 1 through 5. Thus, referring to FIG. 6, the apparatus is depicted in a front elevation view. The apparatus includes a loop feed section 70, a tape feed section 72, a clipper 74, and take out section or rolls 76. It should be noted that the clipper 74 and take out rolls 76 were by themselves known in the prior art, both alone and in combination as apparatus for the manufacture of first tie casing or netting. The present invention particularly relates to a tape feed 72 alone and in combination with a loop feed 70 and together in combination with a clipper 74 and take out rolls 76. The preferred embodiment includes all four sections or elements: loop feed 70, tape feed 72, clipper 74, and take out rolls 76. All of these sections are supported or mounted on a common base plate 80.

LOOP FEED

A bracket 82 on plate 80 supports the drive cylinder 34. The drive cylinder 34 includes a piston rod 84 connected to the loop feed punch 36. As the rod 84 is extended or retracted, the punch 36 will, in turn, extend or retract. Note that the punch 36 includes an arcuate engaging end 86 which is designed to engage a loop 12 and force the loop 12 into the throat of a clipper 74 as described in further detail below.

TAPE FEED

The tape feed 72 is depicted partially in FIG. 6 but more completely in FIGS. 7-10. Before describing tape feed 72, it should be noted that the clipper 74 is mounted on the base 80 and includes a die support plate 88. The tape feed 72 is designed to position the knotted end 16 of a loop 12 parallel to and adjacent to the die plate 88 so that the punch 36 can engage to the knotted end 16 and position it within a throat in a clipper die plate 88.

Referring therefore to FIG. 7, the tape feed comprises a support plate 90 which is positioned on the plate 80 when the component parts are assembled. The plate 90 supports a bracket 92. The bracket 92 is attached by means of fasteners 94 and 96 to the support plate 90. It may be adjustably moved relative to the support plate 90 by loosening the fasteners 94 and 96 and sliding the plate 92 in the direction of the slots 98 there through. A micromotor 100 on adjustable bracket drives the constantly operating friction roller 22 in the path of tape 10 to assist in release of loops 12 from tape 10 as previously described.

The forward guide and idler roller 20 is mounted on the plate 90 transverse to the path of travel of the tape 10. Vertical support brackets 104 and 106 support the incremental tape advance mechanism 30 and a take up reel 108 for the tape 10. The take up reel 108 is constantly driven by an air motor 110 to positively apply take up pressure on a tape 10 which is being advanced by the tape feed 72.

A supply bracket arm 112 is attached to a plate 114 which is, in turn, mounted on the plate 80. The supply bracket arm 112 supports a tape supply reel 116. Tape 10 with loops 12 on the outside surface thereof feed from the reel 116 through a first loop guide 118 and a second loop guide 120 attached to the bracket arm 112, thence over a guide roller 122 and finally over the idler roller 20. The loops remain on the outside of the tape 10 but are removed at the position of the idler roller 20 as previously described.

The tape 10 then passes over adjustable idler rollers 124 then over a fixed idler roller 126 on a movable carriage 130. The tape 10 then fits over sprocket serpine 32 on incremental advance wheel 132 around a further fixed idler roller 134 on the carriage 130 and then wraps onto the take up reel 108.

The incremental advance wheel 132 includes a series a four equally spaced pins 32 which are spaced at 90° intervals about the circumference of the incremental advance wheel 132. Each pin 32 fits within an opening 18 of the tape 10. The incremental advance wheel 132 is mounted on a shaft 142 so that it is freely pivotal. As the take up reel 108 pulls on the tape 10 it will tend to pivot the incremental advance wheel 132 which is normally freely pivotal on the shaft 142. Four equally spaced pins 150 projecting laterally from the wheel 132 are spaced intermediate each of the pins 32. Two of the pins 150 are positioned to engage against a surface 152 on a plate 154 associated with the carriage 130, whenever the wheel 132 is in the position illustrated in FIG. 8. Thus, the wheel 132 cannot normally pivot when in the position showing in FIG. 8 because the pins 150 are engaged against the surface 152.

FIGS. 8 through 10 illustrate the sequence of operations of the movement of the carriage 130 and sprocket wheel 132. To incrementally advance the tape 10, a bar 160 which is translatable toward the wheel 132 is translated on appropriate arms 161 by an appropriate drive mechanism so that a pin 32 is engaged in the bar 160 and pins 150 engage surface 152. This locks wheel 132 in a non-rotatable position. Subsequently, the entire carriage 130 is moved upward by a piston drive mechanism. The upward movement is limited in stroke to the distance between openings 18 so there is a single incremental advance of the tape 10. Moving the carriage 130 upwards thus incrementally advances the tape 10 by pulling the tape 10 over the roller 20. At the top of the stroke of the carriage 130 the bar 160 is released as in FIG. 9. Release of the wheel 132 permits wheel 132 to rotate freely on the shaft 142. Since the tape 10 is taut, the wheel 132 will tend to rotate in the clockwise direction as shown in FIG. 7. It is permitted to rotate since the pins 150 are no longer in position to engage the plate 152. The wheel 132 will then initiate rotation as the carriage 130 is lowered. The carriage 130 operation is thus reversed. As the carriage 130 reverses or moves downward (FIG. 10), the wheel 132 turns in the manner described and the pins 150 will be reoriented so as to align a new pair of pins 150 for engagement with the plate 152. The wheel 132 in thus incrementally rotated one quarter turn so that the next pin 32 is appropriately aligned for engagement with the bar 160 during the next incremental advancement operation. Thus, the wheel 132 rotates 90° or one-quarter of a turn each incremental advance and resetting of the tape advance mechanism.

THE CLIPPER

Referring further to FIG. 7, there is depicted clipper 72 which includes a cylinder assembly 160 which drives a punch 162 through the die plate 88 and more particularly through the channels 24 and 26. The die plate 88 defines a throat 164 into which the netting material 39 is positioned. Note that constantly operating wheels 166 and idler wheel 168 are provided to assist movement of the netting material 39 into the throat and downwardly into the region above a die 170. A clip 49 moves the channel driven by a punch 162. This occurs after the netting material 39 is fitted down through the throat 164 of the clipper.

TAKE OUT ROLLS

The take out rolls 50 and 52 are mounted on platform 80 as are the remainder of the components of the apparatus. Take out roll 52 is an idler roll mounted on arm 54 and driven by a piston cylinder assembly 180 into and out of engagement with the constantly running roller 52 as described with respect to the previous figures.

While there has been set forth a preferred embodiment of the invention, it is to be understood that the invention is to limited only by the following claims and their equivalents.

We claim:
1. Apparatus for feeding an individual closed flexible loop from a series of loops mounted on a continuous length of flexible carrying tape into a clipper device, said tape having an inside and an outside, with a plurality of loops arranged in separate, serial order on the outside of the tape and staggered at a uniform distance from one another along the length of the tape, said tape further including uniformly spaced openings which correspond with the staggered uniform distance at which the loops are arranged on the tape; said apparatus comprising, in combination:

a mounting assembly means for attachment of the apparatus to the clipper device for feeding loops into the clipper device;

a tape supply roll for supplying the continuous length of tape with loops thereon;

a guide roller having an outer surface over which the inside of the tape is wound, whereby the loops on the outside of the tape are tangentially directed from the outer surface of the guide roller into the clipper device, and thus removed from the tape; and a translating tape carriage assembly means for engaging a portion of the tape from which the loops have been removed and for advancing the continuous length of tape an incremental distance to release one individual loop thereon, wherein the translating tape carriage assembly means includes:

(a) a first gripping means for gripping the tape through cooperation with the uniformly spaced openings that correspond with the release of the individual loop, the first gripping means including an incremental advance wheel, and means on the wheel for entering the spaced openings on the tape, the tape passing around the wheel:

(b) a translating carriage advancement means for pulling the tape an incremental distance over the guide roller and releasing the individual loop from the tape, the translating carriage advancement means including a carriage movably mounted to the mounting assembly means, the incremental advance wheel being mounted to the carriage to be pivotal relative to the carriage; and (c) means for releasing and resetting the tape and re-indexing the tape carriage assembly to the uniformly spaced openings that correspond with the release of a next individual loop in the series of loops, the releasing and resetting means including means for engaging the incremental advance wheel to limit the incremental advance wheel against pivotal movement, and to disengage the incremental advance wheel to allow pivotal movement, said wheel engaging-and-disengaging means and said carriage advancement means co-ordinated in motion such that said incremental advance wheel is engaged against pivotal movement when said carriage is advanced, whereby the tape is advanced as the carriage and incremental advance wheel are advanced, and such that said incremental advance wheel is disengaged and allowed pivotal movement when the carriage is returned, whereby the incremental advance wheel rotates along the tape to cause a new portion of the tape to pass around the wheel and whereby the wheel is again in position to advance the tape.

2. Apparatus for feeding an individual closed flexible loop from a series of loops mounted on a continuous length of flexible carrying tape into a clipper device, said tape having an inside and an outside with a plurality of loops arranged in separate, serial order on the outside of the tape and staggered at a uniform distance from one another along the length of the tape, said apparatus comprising, in combination:

a mounting assembly for the apparatus for attachment of the apparatus to the clipper device for feeding loops into the clipper device;

a tape supply roll for supplying the continuous length of tape with loops thereon;

a guide roller having an outer surface over which the inside of the tape is wound, such that the loops on the outside of the tape are tangentially directed from the outer surface of the guide roller into the clipper device, and thus removed from the tape;

a friction release means for engaging an individual loop not properly directed in said tangential direction into the clipper device, said friction release means being adjacent the guide roller and assisting removal of the individual loop from the tape as the tape is moved over the guide roller, said friction release means including a driven stripper roller adjacent said guide roller and contacting the outside of the tape across from the guide roller, the stripper roller and the guide roller having substantially parallel axes of rotation, means for rotating both rollers in identical directions of rotation, and positions relative to each other such that the outer surfaces of the stripper roller and the guide roller move relative to the tape in opposite directions as the tape passes between them; and a tape carriage assembly for engaging the tape and incrementally advancing the tape.

3. In an apparatus for attachment of a U-shaped metal clip around gathered material to provide a first tie for the material, said apparatus of the type including a clipper with a die, a throat wherein the gathered material lies above the die, and a punch for driving the clip against the die to form the clip about the gathered material, the improvement of means for feeding an individual closed flexible loop into the throat over the die, for clipping with the gathered material, said individual loop being one in a series of loops carried on a continuous length of flexible carrying tape, said tape having an inside and an outside, with the loops arranged on the outside of the tape and staggered at a uniform distance from one another along the length of the tape, said tape further including uniformly spaced openings which correspond with the staggered uniform distance at which the loops are arranged on the tape, said improvement comprising, in combination:

a mounting frame assembly for supporting the length of tape along one side of the throat whereby a leading end of the individual loop lies adjacent the throat;

means on the mounting frame assembly for incrementally transporting the length of tape in a manner which aligns the individual loop for insertion into the throat of the clipper, said means including:

(a) a guide roller for guiding the length of tape, said guide roller mounted adjacent the throat transverse to the length of the tape, said tape being intermediate the loops and the guide roller whereby as the tape is incrementally moved over the guide roller the leading end of the individual loop is tangentially released from the tape and projects into an area immediately adjacent one side of the throat for insertion into the throat; and (b) a translating tape carriage assembly means for engaging a portion of the tape from which the loops have been removed and for advancing the continuous length of tape an incremental distance to release on individual loop thereon, wherein the translating tape carriage assembly means includes:

(i) a first gripping means for gripping the tape through cooperation with the uniformly spaced openings that correspond with the release of the individual loop, the first gripping means including an incremental advance wheel, and means on the wheel for entering the spaced openings on the tape, the tape passing around the wheel;

(ii) a translating carriage advancement means for pulling the tape an incremental distance over the guide roller and releasing the individual loop from the tape, the translating carriage advancement means including a carriage movably mounted to the mounting assembly means, the incremental advance wheel being mounted to the carriage to be pivotal relative to the carriage; and (iii) means for releasing and re-setting the tape and re-indexing the tape carriage assembly to the uniformly spaced openings that correspond with the release of a next individual loop in the series of loops, the releasing and resetting means including means for engaging the incremental advance wheel to limit the incremental advance wheel against pivotal movement, and to disengage the incremental advance wheel to allow pivotal movement, said wheel engaging-and-disengaging means and said carriage advancement means coordinated in motion such that said incremental advance wheel is engaged against pivotal movement when said carriage is advanced, whereby the tape is advanced as the carriage and incremental advance wheel are advanced, and such that said incremental advance wheel is disengaged and allowed pivotal movement when the carriage is returned, whereby the incremental advance wheel rotates along the tape to cause a new portion of the tape to pass around the wheel and whereby the wheel is again in position to advance the tape; and means for feeding the leading end of the individual loop released from the tape into the throat.

* * * * *